(12) United States Patent
Takaki et al.

(10) Patent No.: US 7,913,269 B2
(45) Date of Patent: Mar. 22, 2011

(54) MOTOR AND STORAGE DISK DRIVE WITH A CHUCKING MECHANISM FOR RETAINING A DATA STORAGE DISK

(75) Inventors: Hitoshi Takaki, Kyoto (JP); Yusuke Iwai, Kyoto (JP); Tomoya Uchimura, Kyoto (JP)

(73) Assignee: Nidec Corporation, Kyoto (JP)

( * ) Notice: Subject to any disclaimer, the term of this patent is extended or adjusted under 35 U.S.C. 154(b) by 725 days.

(21) Appl. No.: 11/834,130

(22) Filed: Aug. 6, 2007

(65) Prior Publication Data

US 2008/0030109 A1 Feb. 7, 2008

(30) Foreign Application Priority Data

Aug. 4, 2006 (JP) ................. 2006-213937

(51) Int. Cl.
*G11B 17/028* (2006.01)
(52) U.S. Cl. ...... 720/707; 310/67 R; 310/90; 310/261.1; 360/99.08
(58) Field of Classification Search .................. 720/707; 360/99.08; 310/67 R, 90, 261.1
See application file for complete search history.

(56) References Cited

U.S. PATENT DOCUMENTS

| | | | |
|---|---|---|---|
| 5,407,283 A | 4/1995 | Ohtsuka et al. | |
| 6,657,340 B2 * | 12/2003 | Obara | 310/90 |
| 6,700,256 B2 | 3/2004 | Fukutani et al. | |
| 6,936,940 B2 | 8/2005 | Kobayashi et al. | |
| 2002/0195894 A1 * | 12/2002 | Tokunaga | 310/90 |
| 2003/0197438 A1 * | 10/2003 | Oku | 310/90 |
| 2004/0256926 A1 * | 12/2004 | Miyamoto | 310/68 B |
| 2005/0006965 A1 * | 1/2005 | Sato et al. | 310/67 R |
| 2005/0286166 A1 * | 12/2005 | Ando et al. | 360/99.08 |
| 2007/0290571 A1 | 12/2007 | Yoon | |

FOREIGN PATENT DOCUMENTS

| | | |
|---|---|---|
| JP | 5-109001 A | 4/1993 |
| JP | 7-14297 A | 1/1995 |
| JP | 8-317620 A | 11/1996 |
| JP | 2945813 B2 | 6/1999 |
| JP | 11-339379 A | 12/1999 |
| JP | 2002-136031 A | 5/2002 |
| JP | 2002-276594 A | 9/2002 |
| JP | 2003-324891 A | 11/2003 |
| JP | 2006-155705 A | 6/2006 |
| JP | 2007-20241 A | 1/2007 |

* cited by examiner

*Primary Examiner* — Angel A. Castro
(74) *Attorney, Agent, or Firm* — Westerman, Hattori, Daniels & Adrian, LLP

(57) ABSTRACT

A motor used for a data storage disk drive is provided. The motor includes a rotor holder having a cylindrical portion. The cylindrical portion has a radially inner surface defining a through hole and an inner protruding section arranged at an axial end portion of the radially inner surface. The inner protruding section radially inwardly protrudes from the radially inner surface into the through hole. A shaft of the motor is inserted into the through hole and fixed to the radially inner surface of the cylindrical portion of the rotor holder with an adhesive. In the motor, a radially inner end of the inner protruding section of the rotor holder radially opposes an axially upper portion of the shaft. In addition, the portion of the axially lower surface of the inner protruding section of the rotor holder axially opposes the shaft while the axially upper portion of the shaft and the inner protruding portion are arranged in an axially vicinity manner.

21 Claims, 9 Drawing Sheets

MOTOR AND STORAGE DISK DRIVE WITH A CHUCKING MECHANISM FOR RETAINING A DATA STORAGE DISK

BACKGROUND OF THE INVENTION

1. Field of the Invention

The present invention generally relates to a motor used for spinning a data storage disk (e.g., CDs and DVDs) detachably arranged in a storage disk drive storing and/or reproducing data onto/from the data storage disk.

2. Description of the Related Art

Recently, a storage disk drive (e.g., a CD drives and a DVD drives) having a reduced axial thickness and a reduced outer dimension, has been called for. To reduce the outer dimension and the axial thickness of the storage disk drive, components of the storage disk drive having a reduced outer dimension and a reduced axial thickness are demanded. As such, it has been led to the desire for a motor used for spinning a data storage disk (e.g., CDs and DVDs) in the storage disk drive, one of the major components of the storage disk drive, to be reduced in its outer dimension and axial thickness.

Recently, packing density of the data storage disk has been increased. Thus, the motor used the data storage disk is demanded to have a high rotational accuracy.

Generally, the motor used for the storage disk drive includes a shaft, a rotor holder attached to the shaft, and a chucking mechanism arranged on the rotor holder to retain the data storage disk on the rotor holder.

Conventionally, in the motor used for spinning the storage disk such as CDs and DVDs in the optical storage disk drive, the shaft and the rotor holder are fixed to each other as follow.

The U.S. Pat. No. 6,700,256 discloses a motor used for spinning a data storage disk such as CDs and DVDs in an optical storage disk drive.

In the motor according to the U.S. Pat. No. 6,700,256, a shaft 1 is press-fitted into a small bore portion 20 positioned in a bore of the projected annular portion 16 of the rotor frame 2 and an adhesive is disposed between the shaft 1 and the rotor frame 2 to connect them. In particular, before the shaft 1 is press-fitted into the small-bore portion 20, an adhesive 22 is preliminarily applied into the large-bore portion 21, and then, the shaft 1 is press-fitted into the small-bore portion 20 of the rotor boss 31 so as to be integrated with each other.

The laid open Japanese patent publication No. 2003-324891 discloses a motor used for an optical disk driving device (e.g., a CD drive and a DVD drive). The motor, illustrated in FIG. 1 of the laid open Japanese patent publication No. 2003-324891, includes a rotor unit having a hub body 40 made of resin and a rotor case 44 and an axially upper portion of a shaft 38 is integrated with the hub body 40.

BRIEF SUMMARY OF THE INVENTION

Preferred embodiments of the present invention provides a motor used for a data storage disk driving device. In a brushless motor according to one aspect of the preferred embodiments of the present invention, the motor includes a rotor holder rotatable about a center axis and having a cylindrical portion which has a radially inner surface defining a through hole, a shaft inserted into the through hole of the rotor holder and fixed to the rotor holder, a disk placing portion arranged on the rotor holder, and a chucking mechanism retaining a data storage disk in a detachable manner. The shaft has an axially upper end portion from which the shaft is inserted into the through hole. A portion of the rotor holder and a portion of axially upper end portion of the shaft are arranged in vicinity to each other in an axially overlapping manner. The other portion of the upper end portion of the shaft are arranged radially inside of the portion of the rotor holder in a substantially the same axial level.

In the brushless motor according to another aspect of the preferred embodiments of the present invention, the brushless motor includes a rotor holder rotatable about a center axis. The rotor holder includes a cylindrical portion which has a radially inner surface defining a through hole and an inner protruding section radially inwardly protruding into the through hole from an axial end portion of the radially inner surface. The motor also includes a shaft having a constricted portion at which a diameter is constricted, and the shaft is inserted into the through hole of the rotor holder from the constricted portion and fixed to the rotor holder. The motor further includes a disk placing portion arranged on the rotor holder and a chucking mechanism retaining a data storage disk in a detachable manner. A radially inner end of the inner protruding section of the rotor holder radially opposes the constricted portion of the shaft, and the portion of inner protruding section of the rotor holder axially opposes the shaft.

According to the preferred embodiments of the present invention, the shaft and the rotor holder as described above has greater resistance against the force directed so as to engage the inner protruding section and the shaft in the axial direction than the force directed so as to apart the inner protruding section and the shaft. In addition, since the portion of the constricted portion of the shaft radially opposes the radially inner end of the inner protruding portion of the rotor holder, the axial thickness of the motor is reduced while appropriate joint strength of the shaft and the rotor holder is preferably maintained.

DETAIL DESCRIPTION OF PREFERRED EMBODIMENTS

First Preferred Embodiment

With reference to FIGS. 1 to 4, a first preferred embodiment of the present invention will be described in detail. FIG.

Figure 2:
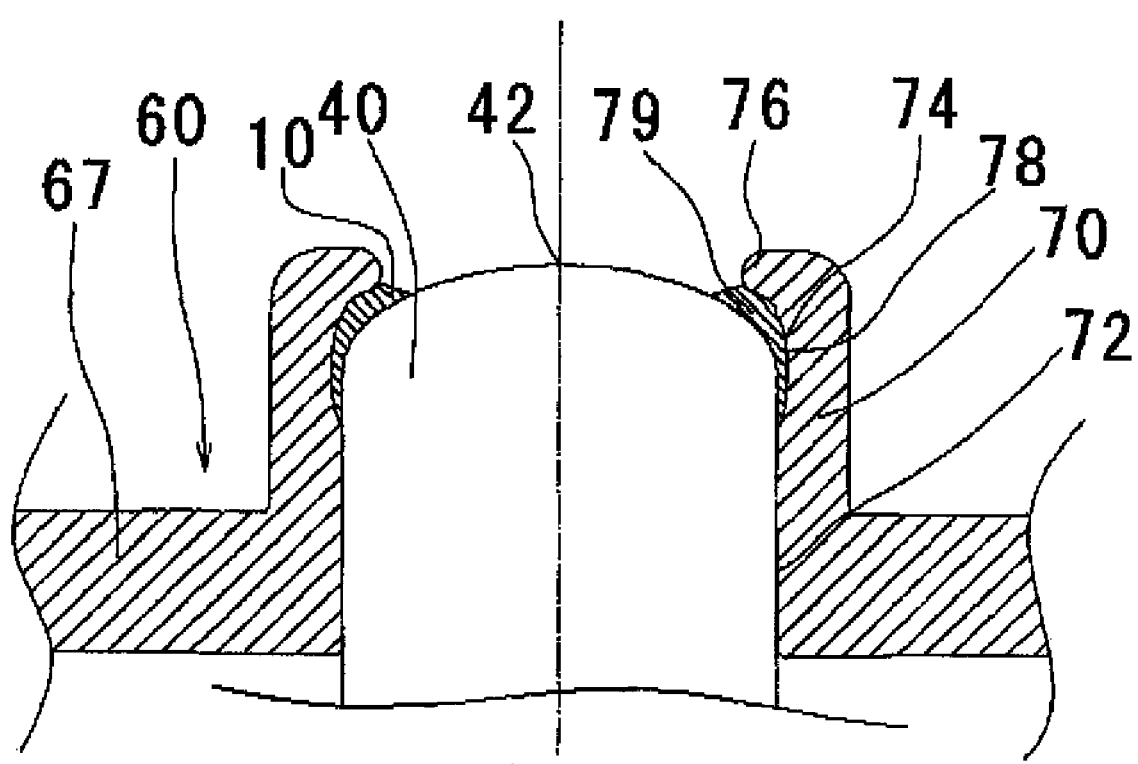
FIG. 2 is a view illustrating a principle part of the motor according to the first preferred embodiment of the present invention in a magnified manner.
Figure 3:
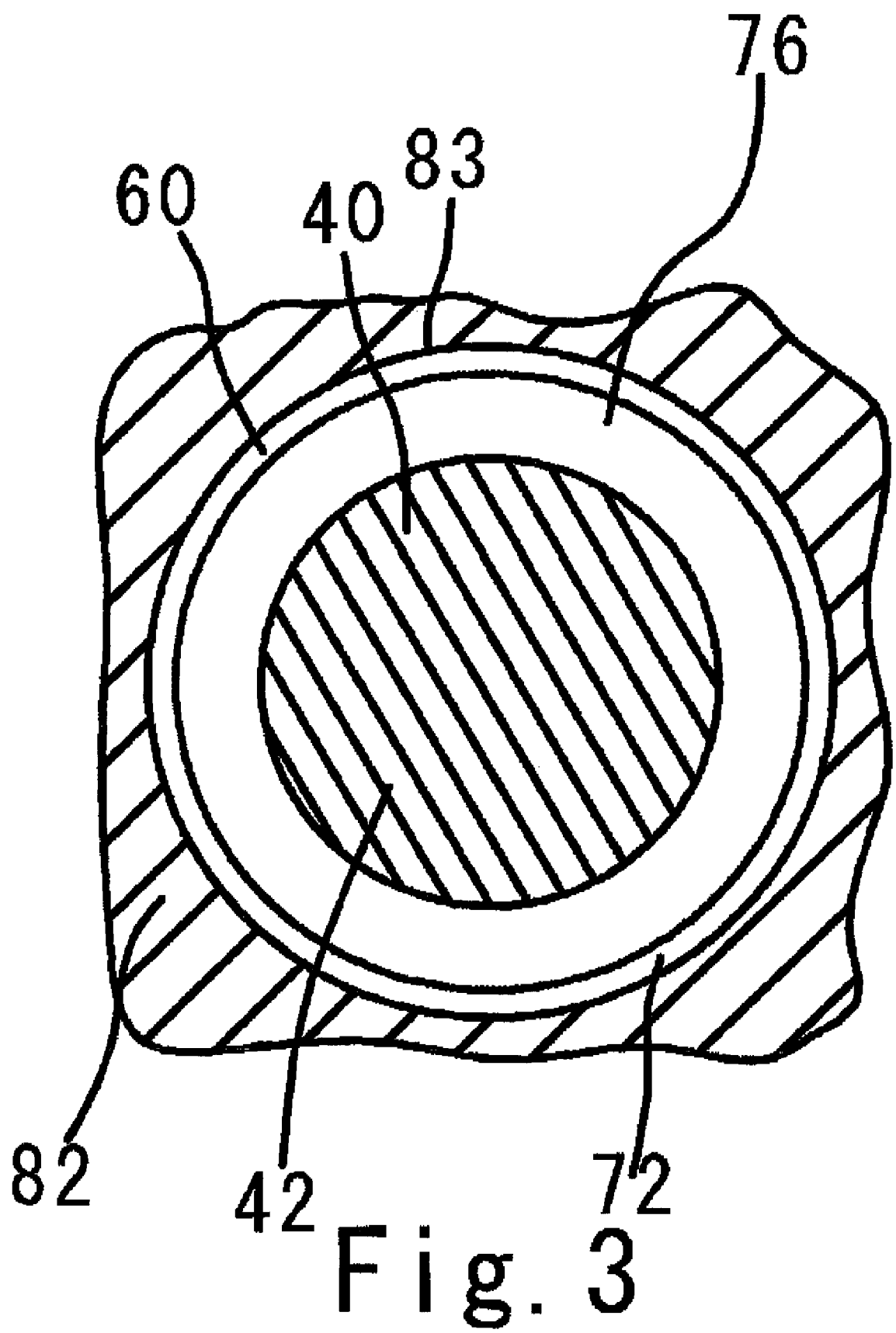
FIG. 3 is a view illustrating the motor according to the first preferred embodiment of the present invention when seen from an axially upper side thereof.
Figure 4:
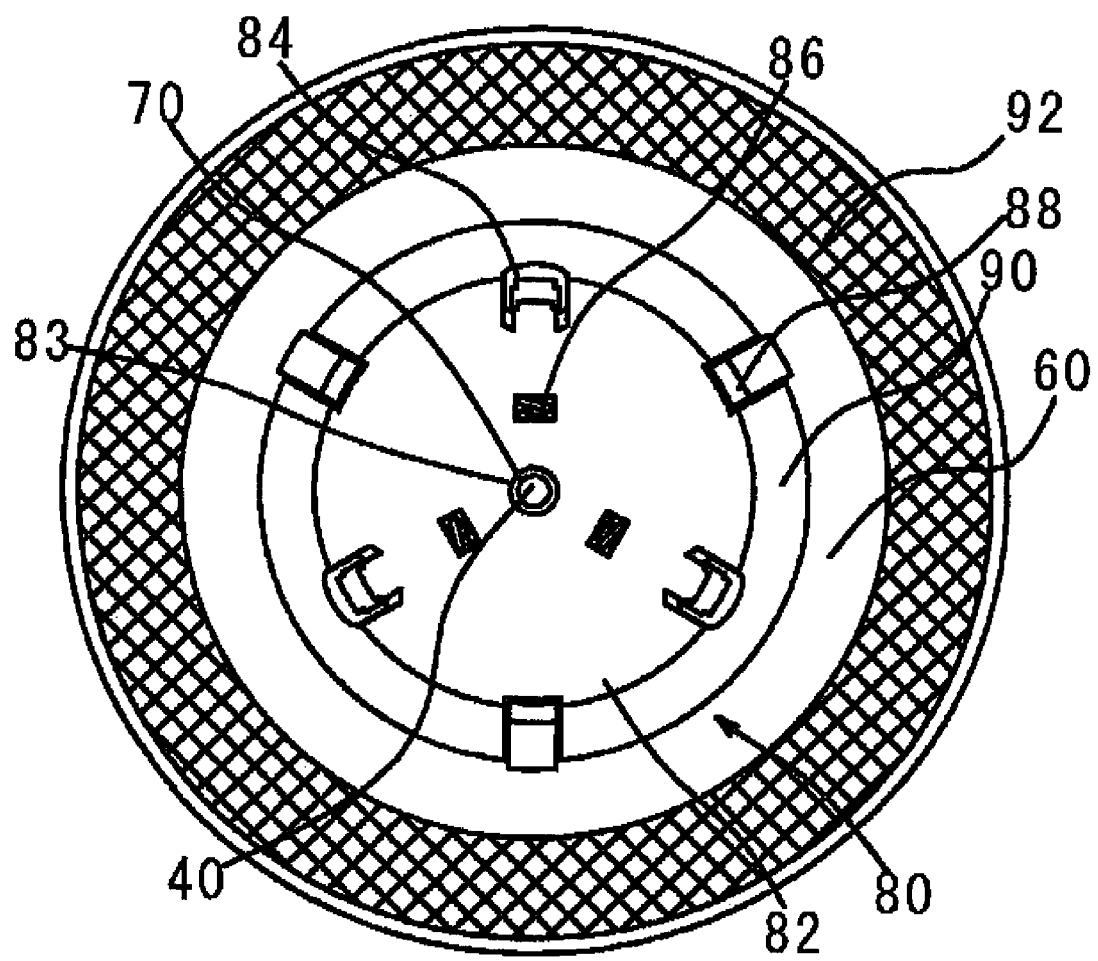
FIG. 4 is a top view illustrating a principle part of the motor according to the first preferred embodiment of the present invention in a magnified manner.

1 is a cross sectional view illustrating a configuration of a motor according to a first preferred embodiment of the present invention. FIG. 2 is a view illustrating a principle part of the motor in a magnified manner. FIG. 3 is a view illustrating the motor when seen from an axially upper side thereof. FIG. 4 is a top view illustrating a principle part of the motor in a magnified manner. For convenience in the following description of the first preferred embodiment of the present invention, a thrust washer 22 side of a motor 1 relative to the shaft 40 along a center axis A will be described as an axially lower side and an opposite side therefrom along a center axis A as an axially upper end, but the center axis A need not necessarily coincide with the direction of gravity.

Configuration of Motor

Figure 1:
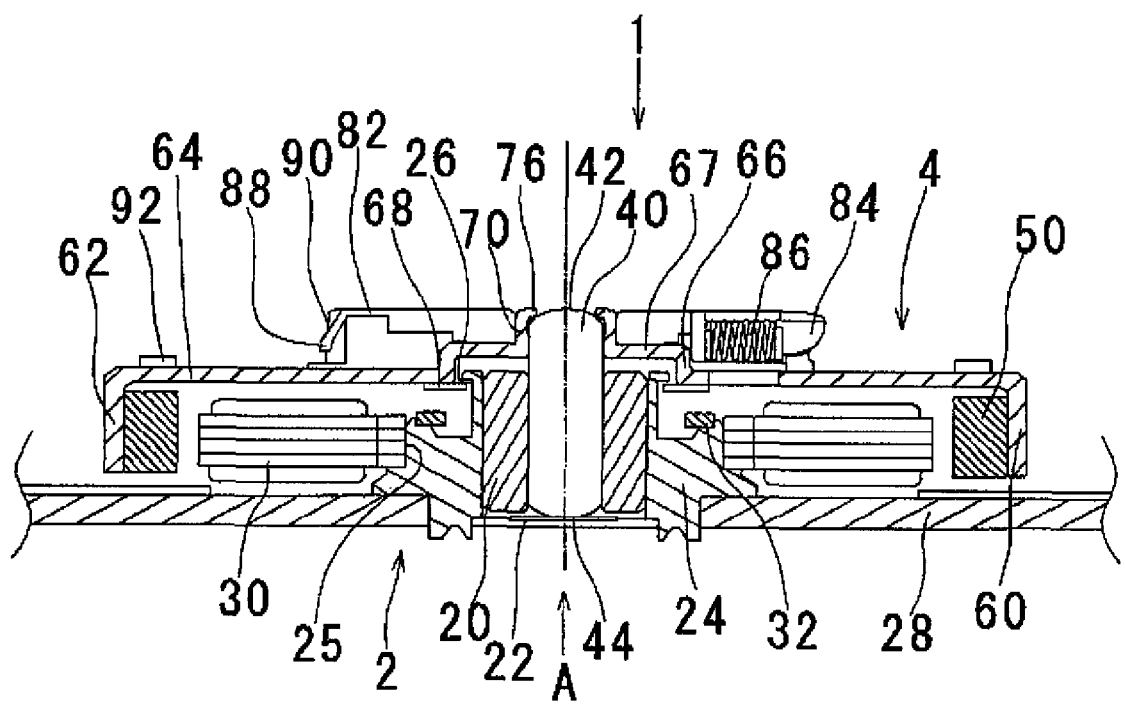
FIG. 1 is a cross sectional view illustrating a configuration of a motor according to a first preferred embodiment of the present invention.

As illustrated in FIG. 1, the motor 1 according to the first preferred embodiment of the present invention includes a stator unit 2 and a rotor unit 4. The stator unit 2 is attached to a body of a storage disk drive (not illustrated in Figs.). The rotor unit 4 is rotatable about the center axis A relative to the stator unit 2.

<Configuration of the Stator Unit>

The stator unit 2 includes a sleeve 20 having a cylindrical shape centering on the center axis A, a housing 24 having a substantially cylindrical shape in which the sleeve 20 is integrally fitted and a part of radially outer surface thereof radially outwardly extending to define a flange portion 25, an armature 30 having an annular shape and attached to an radially outer surface of the flange portion 25 of the housing 24, and a base plate 28 fixed to an axially lower end of the housing 24 by integral fitting.

The sleeve 20 may be made of a porous material (e.g., a sintered metal). The sleeve 20 is impregnated with lubricating oil.

A thrust washer 22 is made of a material having wear-resistance (e.g., polyether ether ketone) and is arranged at inside lower end of the housing 24.

An engaging portion 26, a flange like portion radially outwardly extending from a radially outer surface of the housing 24, is arranged at an axially upper portion of the radially outer surface of the housing 24. The motor 1 includes a retaining member 68 which comes in contact with the engaging portion 26 to prevent a rotor holder 60 from being removed when a force directed to the axially upper direction is applied to the rotor holder 60.

A bias magnet 32 is arranged to an axially upper side of the flange portion 25 of the housing 24 and magnetically attracts the rotor holder 60 in the axially lower direction. By providing the bias magnet 32, the rotor holder 60 is magnetically attracted in the axially lower direction, which leads to magnetically attract the rotor unit 4 in the axially lower direction. Through the configuration, vibration of the rotor unit 4 during a rotation thereof is reduced. In addition, it is further prevented that the rotor unit 4 is removed from the stator unit 2 in the axially upper direction, stabilizing the rotation of the rotor unit 4.

Configuration of Rotor Unit

The rotor unit 4 includes the shaft 40, the rotor holder 60 having a substantially operculated cylindrical shape to which the shaft 40 is fixed, a rotor magnet 50 attached to a radially inner surface of the rotor holder 60 such that the rotor magnet 50 radially faces the armature 30 via a gap defined therebetween, and a chucking mechanism 80 arranged on the rotor holder 60.

The lubricating oil exuding to a radially inside of the sleeve 20 forms an oil film between an outer circumference of the shaft 40 and the inner circumference of the sleeve 20, supporting load directed in the radial direction.

An axially lower surface 44 of the shaft 40 is defined by a curved surface (e.g., a hemispherical surface protruding in the axially lower direction is arranged at the axially lower end of the shaft 40), which comes in point contact with an axially upper surface of the thrust washer 22. When the rotor unit 4 spins, the axially lower surface 44 of the shaft 40 slides on the axially upper surface of the thrust washer 22, supporting the load directed in the axial direction.

The rotor holder 60 is fixed with the axially upper portion of the shaft 40. The rotor holder 60 includes a first cylindrical portion 70 axially extending, a first discoid portion 67 radially outwardly extending from an axially lower end of the first cylindrical portion 70, a second cylindrical portion axially downwardly extending from an radially outer end of the first discoid portion 67, the second discoid portion 64 radially outwardly extending from an axially lower end of the second cylindrical portion 66, and a third cylindrical portion 62 axially downwardly extending from a radially outer end of the second discoid portion 64. The rotor holder 60 is formed by pressing a magnetic metal material (e.g., a stainless steel plate).

The rotor magnet 50 is a permanent magnet having a cylindrical shape, and a radially outer surface thereof is attached to a radially inner surface of the third cylindrical portion 62 with the adhesive. In the present preferred embodiment of the present invention, the rotor holder 60, made of the magnetic metal material, is used as a back yoke of the rotor magnet 50.

A disk placing portion 92 is arranged on an axially upper side of the second discoid portion 64 of the rotor holder 60. In the preferred embodiment of the present invention, the disk placing portion 92 is constituted with an annular member made of an elastic material such as rubber, attached to the axially upper surface of the second discoid portion 64.

The second cylindrical portion 66 of the rotor holder 60 is arranged radially outside of the sleeve 20 and an axially upper portion of the housing 24 (i.e., a part of the housing 24 other than the flange portion 25). Through the configuration, it is possible to reduce the axial thickness of the motor while the axial length of the sleeve 20 (i.e., a major component of a bearing mechanism) is preferably maintained.

In addition, by providing a second cylindrical portion, rigidity of the rotor holder 60 is improved.

The retaining member 68 is welded to an axially lower surface of the second discoid portion 64 of the rotor holder 60. The retaining member 68 includes a ring-shape portion fixed to the second discoid portion 64 and at least one claw portion radially inwardly extending from the ring-shape portion. A radially inner end of the claw portion is arranged radially inner from the radially outer end of the engaging portion 26 such that portions thereof axially face to each other. The retaining member 68 engages with the engaging portion 26 when the rotor unit 4 is axially upwardly moved, preventing the rotor unit 4 from being removed from the stator unit 2.

Configuration for Fixing Shaft and Rotor Holder

As illustrated in FIG. 2, an axially upper portion of the shaft 40 is inserted into a through hole defined by a radially inner surface of the first cylindrical portion 70 of the rotor holder 60 and fixed to the rotor holder 60 with the adhesive.

An axially upper surface 42 of the shaft 40 is defined by a curved surface (e.g., a hemispherical surface protruding in the axially upper direction is arranged at the axially upper end of the shaft 40). In other words, an axially upper portion of the shaft includes a constricted portion at which a diameter of the shaft is gradually decreased along the axially upper direction. It is preferable that the axially upper end and the axially lower end of the shaft are formed in a substantially the same shape. Through the configuration, the shaft may be inserted into the first cylindrical portion 70 of the rotor holder 60 without taking an axial orientation of the shaft into account, facilitating a manufacture of the rotor unit 4.

The radially inner surface of the first cylindrical portion 70 includes a first section 72 at which the shaft 40 is fitted and a second section 74 at which a radially inner diameter of the first cylindrical portion 70 is greater than that of the first section. The second section is arranged axially upper from the first section. The first cylindrical portion 70 includes an inner protruding section 76 radially inwardly extending from an axially upper end of the second section 74 of the first cylindrical 70. When the shaft 40 is fitted in the first cylindrical portion 70, a space 78 is defined between the shaft 40 and a radially inner surface of the second section 74 of the first cylindrical portion 70, and the adhesive used for fixing the shaft 40 to the rotor holder 60 substantially fills the space 78. The inner protruding section 76 is radially inwardly extending such that a portion thereof axially faces the axially upper surface 42 of the shaft 40 via a gap 79 defined therebetween when the shaft 40 is inserted into the first cylindrical portion 70 of the rotor holder 60. In other words, the axially upper surface 42 and the inner protruding section 76 are arranged in vicinity to each other in the axial direction. In addition, a portion of the axially upper surface 42 radially faces a portion of the inner protruding section 76 (e.g., preferably a radially tip end of the inner protruding section 76) when the shaft 40 is inserted into the first cylindrical portion 70. The space 78 and the gap 79 is a continuous space and are filled with the cured adhesive 10 as illustrated in FIG. 2, defining an adhesive-pool portion.

Through the configuration described above, in which the inner protruding section 76 of the first cylindrical portion 70 radially inwardly extends above the axially upper surface 42 of the shaft 40, the rotor holder 60 does not axially downwardly moved when the excessive load axially downwardly directed is applied to the rotor holder 60.

Conventionally, in the conventional motor, in order to prevent the rotor holder from being moved in the axial direction when the excessive load axially downwardly directed is applied to the rotor holder, the areas of the shaft and the rotor holder at which they are fixed to each other by adhesive is lengthened in the axial direction, making the axial height of the motor greater. As for another technique conventionally adapted, the shaft is inserted into the concave portion arranged in the rotor holder. In this technique, the axially upper end of the shaft is covered by the rotor holder, making the axial height of the motor greater as well. In the preferred embodiment of the present invention, the shaft 40 is inserted into the through hole of the rotor holder 60 having the inner protruding section 76 radially inwardly extending into the through hole above the axially upper surface 42 of the shaft 40. Through the configuration, the rotor holder 60 does not axially downwardly moved when the excessive load axially downwardly directed is applied to the rotor holder 60. Additionally, in the preferred embodiments of the present invention, the portion of the axially upper surface 42 is accommodated in a bore defined by a radially inner end of inner protruding section 76. Thus, according to the preferred embodiment of the present invention, the shaft 40 and the rotor holder 60 are firmly fixed to each other by the adhesive without increasing the axial thickness of the motor.

Next, a method of fixing the shaft 40 and the rotor holder 60 of the motor 1 according to the first preferred embodiment of the present invention will be described in detail. It should be noted that the method described below will be preferably applied to the motor according to after-mentioned second and third preferred embodiments of the present invention.

Firstly, the adhesive 10 is applied to an axially lower section of the radially inner surface of the first cylindrical portion 70.

Secondly, the shaft 40 is inserted into the first cylindrical portion 70 from the axially lower side of the rotor holder 60. Since a gap between the shaft 40 and the radially inner surface of the first cylindrical portion 70 is small at the first section 72, a portion of the adhesive 10 applied to the axially lower section of the radially inner surface of the first cylindrical portion 70 is pushed to the axially upper direction and is spread over the radially inner surface of the first cylindrical portion 70 by the axially upper surface 42 and the radially outer surface of the shaft 40. The other portion of the adhesive 10 is pressed to the axially upper portion of the radially inner surface of the first cylindrical portion 70, and is arranged in the space 78 and the gap 79 defined by the second section 74 of the first cylindrical portion 70, the shaft 40, and the inner protruding section 76. Through the processes described above, the space 78 and the gap 79 are filled with the adhesive 10.

Upon inserting the shaft 40 into the first cylindrical portion 70, the axially upper surface 42 of the shaft 40 may come in contact with the inner protruding section 76. However, it is preferable that the axially upper surface 42 does not come in contact with the inner protruding section 76. In the preferred embodiment of the present invention, the first cylindrical portion 70 of the rotor holder 60 is formed by the burring process. In general, there can be variations in size between the products manufactured by the burring process. Thus, in case that the shaft 40 is inserted into the first cylindrical portion 70 until the axially upper surface 42 comes in contact with the inner protruding section 76, the axial height between the axially lower end of the shaft 40 and the disk placing portion 92 may vary in individual motors 1, making it difficult to ensure the preferable rotational precision of individual motors 1. In addition, coming in contact with the axially upper surface 42 and the inner protruding section 76, coaxiality and perpendicularity of the rotor holder 60 and the shaft 40 may be degraded as well.

In the preferred embodiments of the present invention, the positioning and the alignment of the shaft 40 and the rotor holder 60 is performed with a jig. After the positioning and the alignment of the shaft 40 and the rotor holder 60 is performed, the adhesive 10 is cured. Through the configuration, the shaft 40 and the rotor holder 60 are firmly fixed to each other while the shaft 40 and the rotor holder 60 are precisely aligned.

Configuration of Chucking Mechanism

As illustrated in FIG. 3, the chucking mechanism 80 is arranged around the first cylindrical portion 70 of the rotor holder 60. The chucking mechanism 80 retains the data storage disk on the motor 1. The chucking mechanism 80 includes a chucking case 82 centered on the center axis A having a substantially-truncated-cone-shaped first tapered portion 90, three of aligning claws 88 arranged to the chucking case 82 in a substantially-circumferentially-equally-spaced manner, and bias springs 86 arranged radially between the chucking claws and the chucking case 92, and radially outwardly biasing the chucking claws 84.

The chucking case 82 includes a chucking-case through hole 83 defined by a radially inner surface thereof. The chucking case is fixed to the rotor holder 60 by fixing the radially inner surface of the chucking case 82 to the radially outer surface of the first cylindrical portion 70 with an adhesive.

Next, a mechanism to retain the data storage disk onto the chucking mechanism will be described below. Firstly, the data storage disk having a radially inner surface defining a through hole is moved toward the chucking mechanism 80 from axially upper side thereof. Then, an axially lower end of the radially inner surface of the data storage disk comes in contact with the first tapered section 90 of the chucking case 82, and the data storage disk is guided in the axially lower direction. The data storage disk is further moved in the axially lower direction, the radially inner surface of the data storage disk comes in contact with the chucking claws 84. When the data storage disk is further axially downwardly moved, the chucking claws 84 are radially inwardly pressed and move in the radially inner direction. When the data storage disk is further axially downwardly moved, the axially lower surface of the data storage disk comes in contact with the disk placing portion 92, and the chucking claws 84 are radially outwardly moved due to force which bias springs 86 apply to the chucking claws 84, retaining the data storage disk on the rotor holder 60. In addition, the data storage disk is aligned with the center axis A by the aligning claws 88 arranged to the chucking case 82 in a cantilever manner. As described above, when the data storage disk is arranged on the motor 1, the force directed in the axially lower direction is applied to the rotor holder 60.

In general, three kinds of force is applied to the rotor unit 60 of the motor 1 which rotatably rotates the data storage disk such as CDs and DVDs arranged thereon. The first force is applied to the rotor holder 60 upon setting the data storage disk onto the rotor holder 60, and is directed to the axially lower direction. The second force is applied to the rotor holder 60 upon detaching the data storage disk from the rotor holder 60, and is directed to the axially upper direction. The third force is applied to the rotor holder 60 upon starting and stopping the rotation of the data storage disk, and is directed in the circumferential direction. Among those three forces, the first force applied to the rotor holder 60 upon setting the data storage disk thereon is generally the strongest.

In particular, in a motor having a so-called self-chucking mechanism in which the chucking mechanism is arranged on the motor as described in the preferred embodiments of the present invention, an user directly presses the data storage disk onto the motor, being likely that the excessive force directed in the axially lower direction is applied to the rotor holder.

According to the preferred embodiments of the present invention, the first cylindrical portion 70 of the rotor holder 60 includes the inner protruding section 76 arranged axially above the axially upper surface 42 of the shaft 40, preventing the rotor holder 60 from being moved in the axially downward direction when the excessive load is applied to the rotor holder 60. In other words, it is possible to firmly fix the shaft 40 and the rotor holder 60 to each other without increasing the axial thickness of the motor 1.

As illustrated in FIG. 4, the inner protruding section 76 of the first cylindrical portion 70 covers a part of the axially upper surface 42 of the shaft 40 when seen from the axially upper side of the motor 1. In the preferred embodiments of the present invention, the first cylindrical portion 70 is formed by a burring process. Through the burring process, an opening (e.g., circular opening in the present preferred embodiment of the present invention) defined by the radially inner end of the inner protruding section 76 is formed in an easy and less costly manner.

Second Preferred Embodiment

Figure 5:
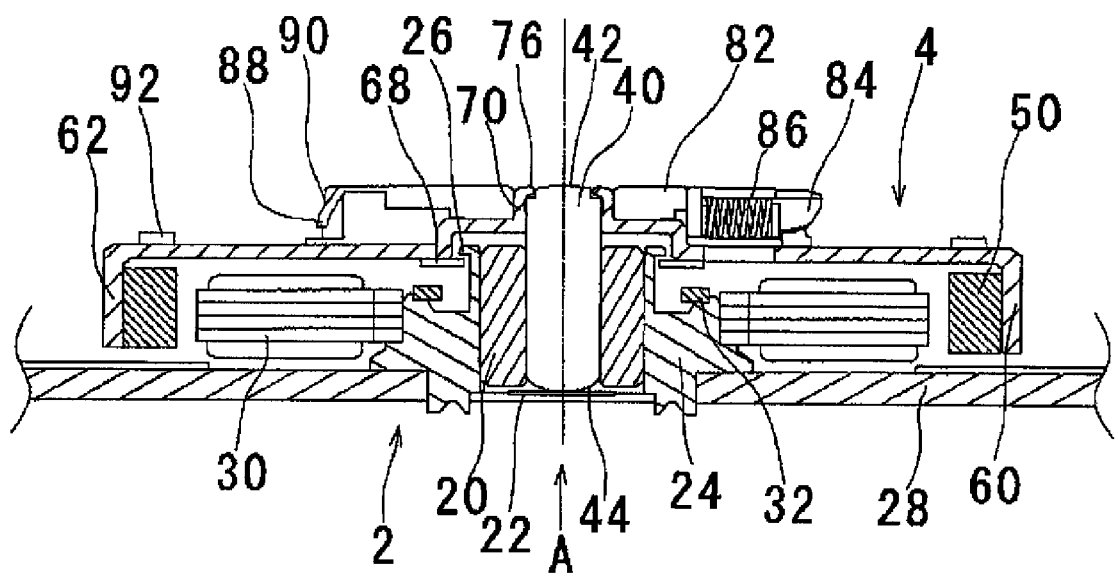
FIG. 5 is a cross sectional view illustrating a configuration of a motor according to a second preferred embodiment of the present invention.
Figure 6:
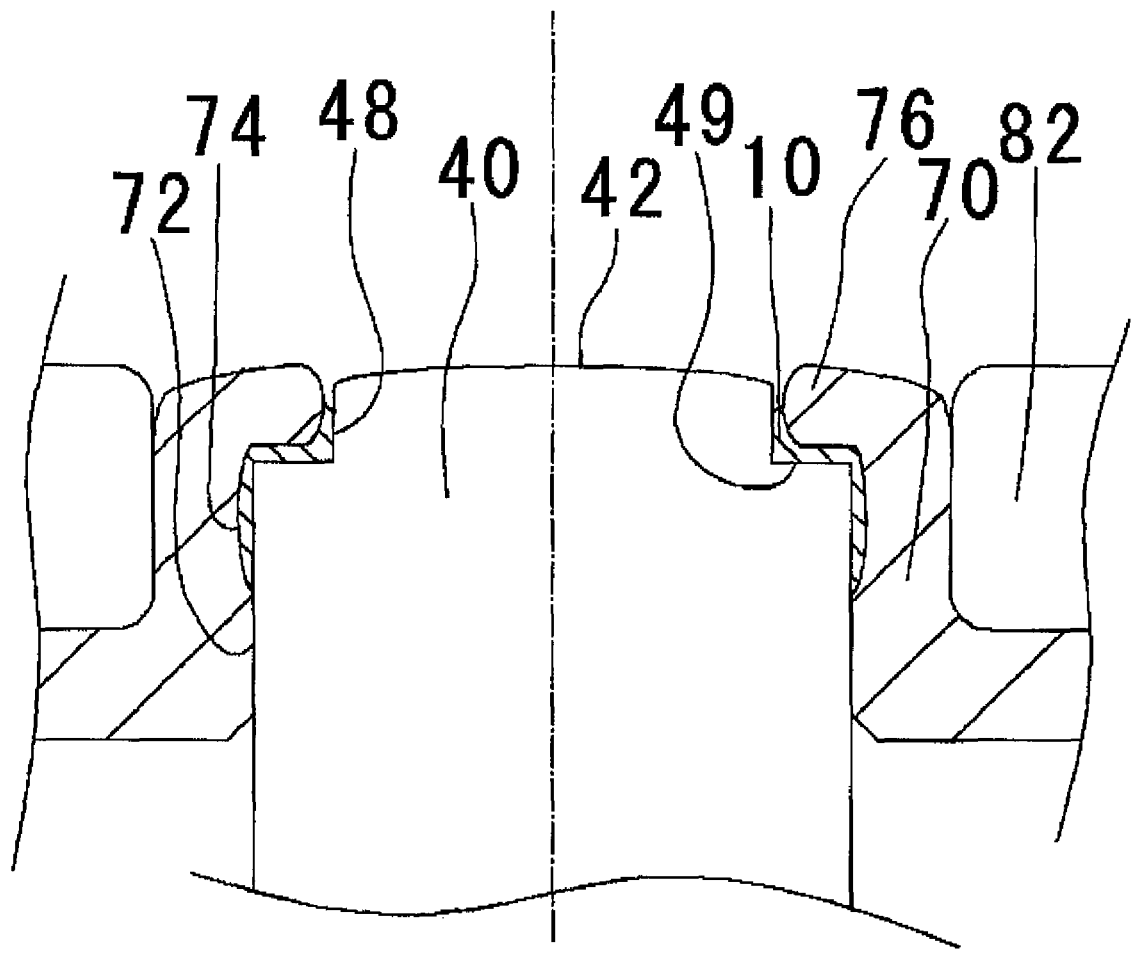
FIG. 6 is a view illustrating a principle part of the motor according to the second preferred embodiment of the present invention in a magnified manner.

FIG. 5 is a cross sectional view illustrating a configuration of a motor according to a second preferred embodiment of the present invention. FIG. 6 is a view illustrating a principle part of the motor according to the second preferred embodiment of the present invention in a magnified manner.

As illustrated in FIG. 5, the motor according to the second preferred embodiment of the present invention is different in a structure of an axially upper portion the shaft 40 from the motor according to the first preferred embodiment of the present invention. Other configuration is substantially the same as that described in the foregoing detail description.

As illustrated in FIG. 6, a constricted portion, at which an outer diameter of the shaft 40 is reduced, is arranged at the axially upper portion of the shaft 40. In the preferred embodiment of the present invention, the constricted portion includes a cylindrical section 48 of the shaft 40 and the axially upper surface 42. The cylindrical section 48 has a diameter smaller than that of the radially outer of portion of the shaft arranged axially lower from the cylindrical section 48. The shaft 40 also includes a shaft-discoid portion 49 radially inwardly extending from the radially outer surface of the shaft 40. The shaft-discoid portion 49 is a surface perpendicular to the center axis A and connects the cylindrical section 48 and radially outer surface of the shaft 40. The diameter of the cylindrical section 48 is smaller than a diameter of the opening defined by the radially inner end of the inner protruding section 76 of the first cylindrical portion 70. A portion of the cylindrical section 48 is inserted into the opening. The axially lower surface of the inner protruding section 76 is substantially parallel to the shaft-discoid portion 49, i.e., substantially perpendicular to the center axis A.

Through the configuration described above, the shaft 40 and the rotor holder 60 is fixed to each other with a sufficient strength against the force directed in the axially lower direction.

Third Preferred Embodiment

Figure 7:
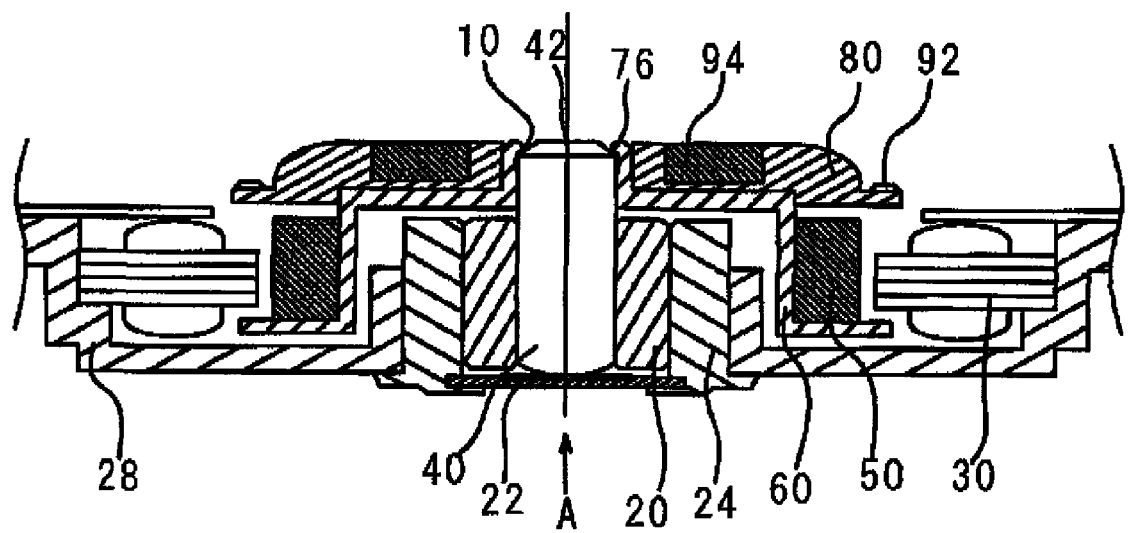
FIG. 7 is a cross sectional view illustrating a configuration of a motor according to a third preferred embodiment of the present invention.

With reference to FIG. 7, a third preferred embodiment of the present invention will be described below.

As illustrated in FIG. 7, the motor 1 according to the third preferred embodiment of the present invention is so-called inner rotor type motor in which the rotor magnet 50 is arranged radially inside of the armature 30. In the third preferred embodiment of the present invention, the data storage disk is retained on the motor 1 by axially clamping the data storage disk with the disk placing portion 92 and a clamp yoke (not illustrated in Figs.) axially attracting by the clamp magnet 94. When the force directed in the axially upper direction is applied to the rotor holder 60, the radially outermost portion of the rotor holder 60 comes in contact with the stator 30, preventing the rotor unit from being removed in the axially upper direction.

The configuration of joining the rotor holder 60 and the shaft 40 may be preferably applied to the motor 1 according to the third preferred embodiment the present invention.

Method of Examining Joint Strength

Figure 8:
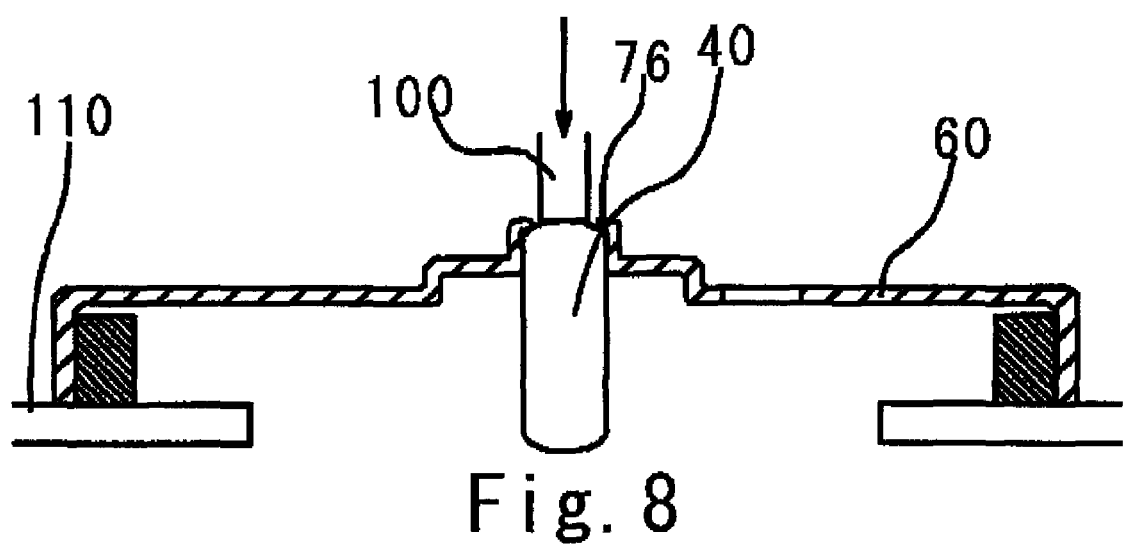
FIG. 8 is a schematic view illustrating a shaft and a rotor holder while an examination to determine joint strength therebetween is performed thereon.
Figure 9:
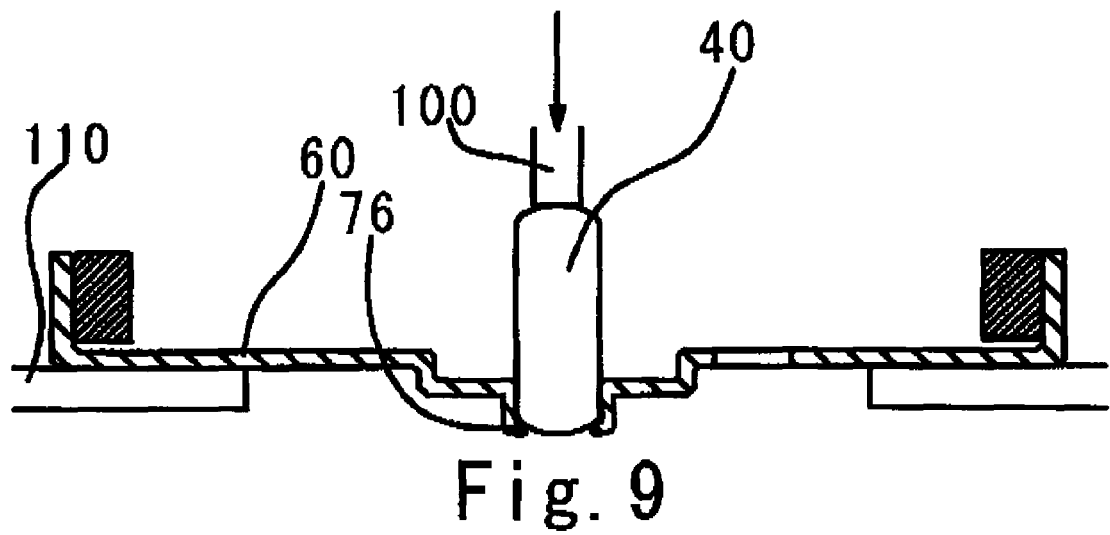
FIG. 9 is a schematic view illustrating a shaft and a rotor holder while an examination to determine joint strength therebetween is performed thereon.

FIG. 8 is a schematic view illustrating the shaft 40 and the rotor holder 60 while an examination for determining joint strength therebetween is performed thereon. FIG. 9 is a schematic view illustrating the shaft 40 and the rotor holder 60 while an examination for determining joint strength therebetween is performed thereon.

The method of examining the joint strength of the shaft 40 and the rotor holder 60 will be described below. As illustrated in FIGS. 8 and 9, a press jig 100 and a support jig 110 are used in the examination of the joint strength of the shaft 40 and the rotor holder 60. In FIG. 9, the shaft 40 and the rotor holder 60 are arranged in an upside down manner from FIG. 8. For convenience in the following explanation, words such as upper-in-drawing, lower-in-drawing, and the like may be used for describing positional relationships between respective members and directions. It should be noted, however, those words merely indicate positional relationships and directions in the drawings.

The press jig 100 is movable in the upper/lower-in-drawing direction. The support jig 110 is arranged in the lower-in-drawing portion from the pressing jig 100. The support jig 110 is fixedly arranged to a work table (not illustrated in Figs.).

In the examination, the rotor holder 60 of the rotor unit 4 is arranged on the support jig 110.

Then, the press jig 100 is moved in the upper to lower-in-drawing direction as illustrated in FIGS. 8 and 9 by arrows. The press jig 100 then comes in contact with the shaft 40 and presses the shaft 40 in the lower-in-drawing direction. As a pressure applied the shaft 40 increases, a position of the shaft 40 are moved relative to the rotor holder 60. The pressure applied to the shaft 40 at a point when the shaft 40 is moved relative to the rotor holder 60 is regarded as a joint strength between the shaft 40 and the rotor holder 60.

Then, as illustrated in FIG. 9, the shaft 40 and the rotor holder 60 are arranged in an upside down manner from FIG. 8, and the joint strength of the shaft 40 and the rotor holder 60 is examined in a similar manner as described above.

Through the examination, the shaft 40 and the rotor holder 60 joined as described above has greater resistance against the force directed so as to engage the inner protruding section 76 and the axially upper surface 42 of the shaft 40 than the force directed so as to apart the inner protruding section 76 and the axially upper surface 42 of the shaft 40.

While preferred embodiments of the present invention have been described above, it is to be understood that variations and modifications will be apparent to those skilled in the art without departing the scope and spirit of the present invention.

It is not limited that the constricted portion arranged axially upper portion of the shaft 40 is defined by a curved surface or hemispherical surface. It should be noted that the constricted portion may be defined by a chamfer surface. In other words, the constricted portion of the shaft 40 may have a truncated cone shape as illustrated in FIG. 7. In addition, the axially upper surface 42 may be a substantially flat surface and the shaft may includes a constricted portion connecting radially outer surface of the shaft 40 and the axially upper surface 42. The axially upper portion of the shaft 40 may be any suitable shape as long as a portion of the constricted portion axially opposes the inner protruding section 76 and the other portion of the constricted portion radially opposes the radially inner end of the inner protruding section 76.

The motor according to the preferred embodiments of the present invention is used for the storage disk drive to which the data storage disk is detachably arranged. It should be noted, however, the motor according to the preferred embodiments of the present invention may be preferably used for other applications in which the force directed in the axially lower direction is applied to the rotor holder 60.

In the preferred embodiments of the present invention, the inner protruding section 76 is an annular extending radially inwardly protruding from the axially upper end of the first cylindrical portion 70. It should be noted that a plurality of inner protruding section 76 arranged in a circumferentially spaced manner may be provided to the first cylindrical section 70.

In the preferred embodiments of the present invention, the rotor holder 60 is made of the magnetic steel material (e.g., stainless steel), but the rotor holder 60 may be formed by other material (e.g., resin and aluminum).

In the preferred embodiments of the present invention, the rotor magnet 50 is directly fixed to the rotor holder 60, but the rotor magnet 50 may be fixed to a yoke attached to the rotor holder 60.

The motor according to the preferred embodiments of the present invention may include a bearing mechanism other than that described in the foregoing description. A ball bearing, a fluid dynamic pressure employing bearing, and the like may be adapted to the motor according to the preferred embodiments of the present invention.

The motor according to the preferred embodiments of the present invention does not necessarily have to be a so-called outer-rotor motor, in which the rotor magnet is arranged radially outside of the armature, but may be an inner-rotor type, in which the rotor magnet is arranged radially inside of the armature. The motor may be so-called axial-gap type motor, in which the rotor magnet is arranged so as to face the armature in the axial direction via a gap defined therebetween.

The materials, shapes, assembling methods, and the like of the motor are not also limited to those described above. The scope of the present invention, therefore, is to be determined solely by the following claims.

What is claimed is:

1. A brushless motor comprising:
    a rotor holder rotatable about a center axis and including a cylindrical portion comprising a radially inner surface defining a through hole, and an inner protruding section inward extending from the radially inner surface;
    a shaft inserted into the through hole of the rotor holder such that a space is provided between the radially inner surface and the inner protruding section, the shaft being fixed to the rotor holder such that the inner protruding section is located above an upper surface of the shaft;
    an adhesive provided in the space;
    a disk placing portion arranged on the rotor holder; and
    a chucking mechanism retaining a data storage disk in a detachable manner.

2. A brushless motor according to claim 1, wherein the shaft has an axially upper end portion from which the shaft is inserted into the through hole;
    wherein a portion of the rotor holder and a portion of the axially upper end portion of the shaft are arranged in vicinity to each other in the axial direction in an axially overlapping manner, and
    wherein an other portion of the upper end portion of the shaft are arranged radially inside of the portion of the rotor holder in a substantially the same axial level.

3. The brushless motor as set forth in claim 2, wherein the rotor holder includes an inner protruding section radially inwardly extending into the through hole from an axially upper end of the radially inner surface and axially overlapping with the shaft.

4. The brushless motor as set forth in claim 3, wherein:
    the axially upper end portion of the shaft includes a constricted portion at which a diameter of the shaft is narrowed;

a portion of the constricted portion of the shaft is arranged radially inside of the inner protruding section in a substantially the same axial level.

5. The brushless motor as set forth in claim 3, wherein an axially end portion of the shaft has a substantially truncated cone shape or a substantially hemispherical shape.

6. The brushless motor as set forth in claim 3, wherein the rotor holder is formed by press working, and the cylindrical portion is formed by burring working such that the inner protruding section and the cylindrical portion are integrally formed.

7. The brushless motor as set forth in claim 6, wherein a diameter of the through hole is greater than an outer diameter of a portion of the shaft where is inserted into the cylindrical portion, and the adhesive is provided between the portion of the shaft and the radially inner surface of the cylindrical portion defining the through hole.

8. The brushless motor as set forth in claim 7, wherein
the radially inner surface of the cylindrical portion includes a first section and a second section arranged axially upper from the first section and having a greater diameter than that of the first section,
the space is defined between the shaft, and the second section and a portion of the inner protruding section axially opposing the shaft, and
an amount of the adhesive arranged in the adhesive-pool portion is greater than that arranged between the shaft and the first section.

9. The brushless motor as set forth in claim 1, wherein
the chucking mechanism retaining in the detachable manner the data storage disk having a radially inner surface defining a center bore includes a chucking case which comes in contact with the radially inner surface of the data storage disk,
the chucking case includes a radially inner surface defining a chucking-case through hole in which the cylindrical portion of the rotor holder is inserted, the radially inner surface of the chucking case is attached to a radially outer surface of the cylindrical portion of the rotor holder.

10. The brushless motor as set forth in claim 9, wherein
the chucking mechanism further includes
a chucking claw arranged in a movable manner in a radial direction, and
a bias spring arranged in the chucking case and applying a force pressing the chucking claw in the radially outside direction,
a radially tip end of the chucking claw comes in contact with the radially inner surface of the data storage disk to retain the data storage disk.

11. The brushless motor as set forth in claim 1, further comprising
a stator unit including
a bearing having a substantially cylindrical shape and supporting the shaft in a rotatable manner,
a housing having a radially inner surface to which the bearing is attached, and
a base plate to which the housing is arranged,
wherein the rotor holder includes a discoid portion radially outwardly extending from an axially lower end of the cylindrical portion and the other cylindrical portion axially downwardly extending from the radially outer end of the discoid portion,
wherein an inner diameter of the other cylindrical portion is greater than an outer diameter of the housing at the axially upper side thereof, and
wherein an axially upper end of the housing is arranged axially upper from an axially lower end of the other cylindrical portion.

12. A storage disk driving device comprising the motor as set forth in claim 11, wherein the brushless motor rotates the data storage disk retained on the brushless motor with centering on the center axis.

13. A brushless motor according to claim 1, wherein the shaft has a constricted portion at which a diameter is narrowed, wherein the shaft is inserted into the through hole of the rotor holder from the constricted portion and fixed to the rotor holder;
wherein a radially inner end of the inner protruding section of the rotor holder radially opposes the constricted portion of the shaft, and the portion of inner protruding section of the rotor holder axially opposes the shaft.

14. The brushless motor as set forth in claim 13, wherein the constricted portion of the shaft has a substantially truncated cone shape or a substantially hemispherical shape.

15. The brushless motor as set forth in claim 13, wherein the shaft includes a shaft-discoid portion which is defined by a substantially annular surface connecting the radially outer surface of the shaft and the constricted portion, and the portion of the inner protruding section opposing the shaft in the axial direction is substantially parallel to the shaft-discoid portion.

16. The brushless motor as set forth in claim 13, wherein
the radially inner surface of the cylindrical portion includes a first section and a second section arranged axially upper from the first section and having a greater diameter than that of the first section,
the space is defined between the shaft, and the second section and a portion of the inner protruding section axially opposing the shaft, and
an amount of the adhesive arranged in the adhesive-pool portion is greater than that arranged between the shaft and the first section.

17. The brushless motor as set forth in claim 16, wherein the shaft includes a shaft-discoid portion which is defined by a substantially annular surface connecting the radially outer surface of the shaft and the constricted portion, the second section of the radially inner surface of the rotor holder is arranged radially outside of the shaft-discoid portion.

18. The brushless motor as set forth in claim 13, wherein
the chucking mechanism retaining in the detachable manner the data storage disk having a radially inner surface defining a center bore includes a chucking case which comes in contact with the radially inner surface of the data storage disk,
the chucking case includes a radially inner surface defining a chucking-case through hole in which the cylindrical portion of the rotor holder is inserted, and
the radially inner surface of the chucking case is attached to a radially outer surface of the cylindrical portion of the rotor holder.

19. The brushless motor as set forth in claim 18, wherein the chucking mechanism further includes
a chucking claw arranged in a movable manner in a radial direction, and a bias spring arranged in the chucking case and applying a force pressing the chucking claw in the radially outside direction, wherein a radially tip end of the chucking claw comes in contact with the radially inner surface of the data storage disk to retain the data storage disk.

20. The brushless motor as set forth in claim 13, further comprising a stator unit including a bearing having a substantially cylindrical shape and supporting the shaft in a rotatable manner, a housing having a radially inner surface to which the bearing is attached, and a base plate to which the housing is arranged, wherein the rotor holder includes a discoid portion radially outwardly extending from an axially lower end of the cylindrical portion and the other cylindrical portion axially downwardly extending from the radially outer end of the discoid portion, an inner diameter of the other cylindrical portion is greater than an outer diameter of the housing at the axially upper side thereof, and an axially upper end of the housing is arranged axially upper from an axially lower end of the other cylindrical portion.

21. A storage disk driving device comprising the motor as set forth in claim 20, wherein the brushless motor rotates the data storage disk retained thereon with centering on the center axis.

* * * * *